(No Model.) 2 Sheets—Sheet 1.
F. WEBER.
DUMPING WAGON.
No. 501,390. Patented July 11, 1893.
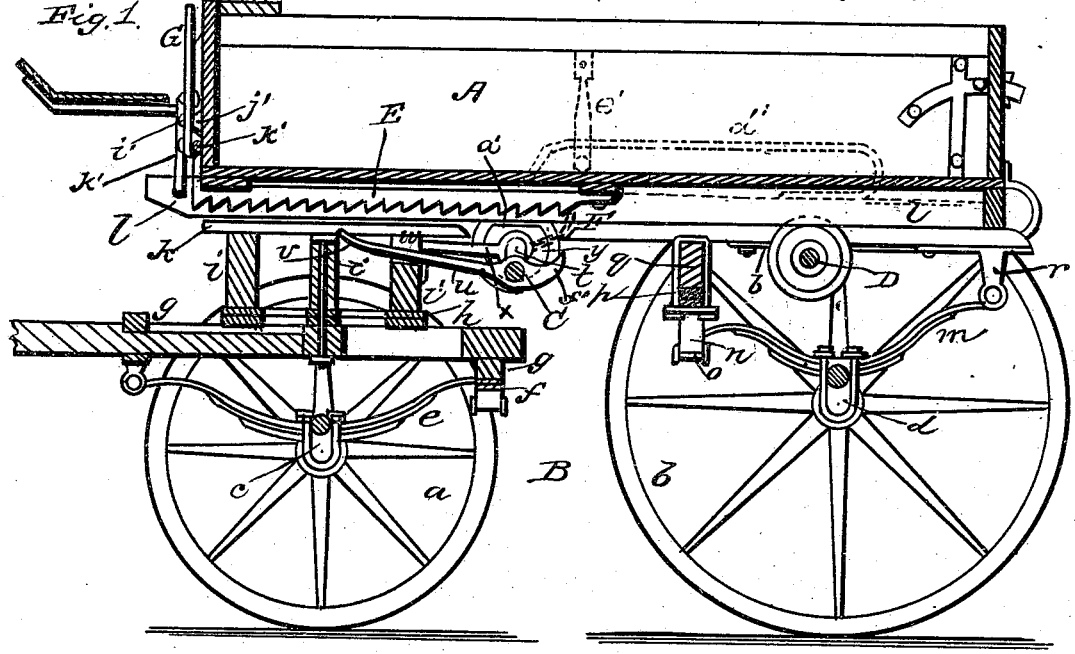
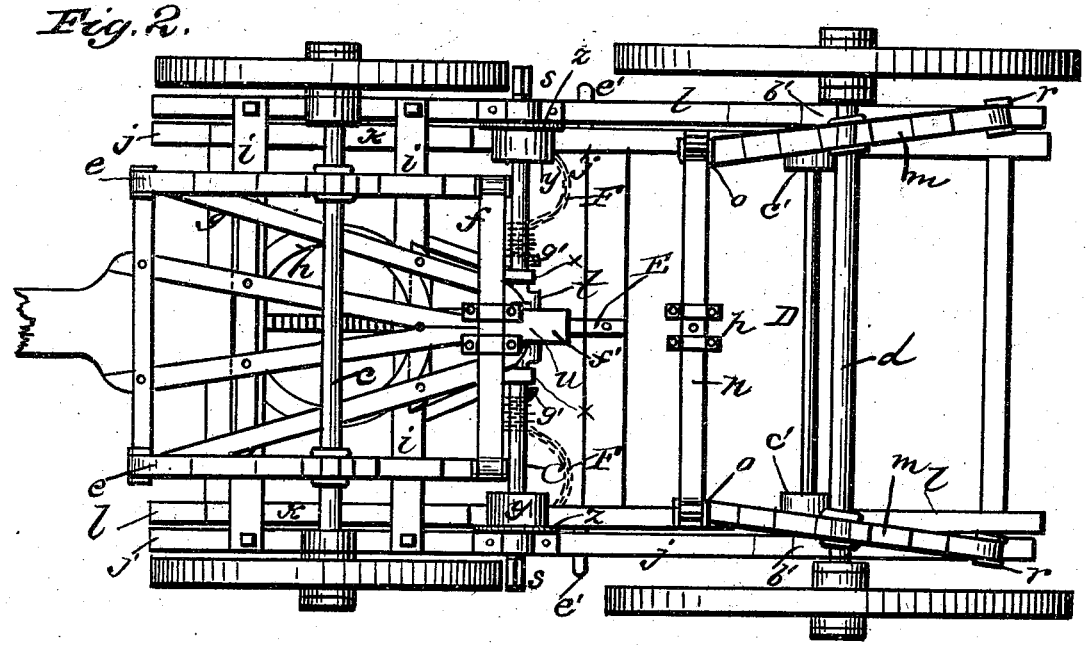
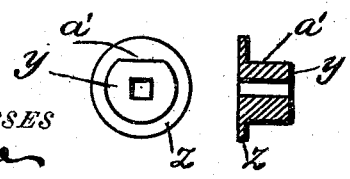
WITNESSES
Jas. B. Clarke
M. M. Morris.
INVENTOR
Frank Weber
By E. H. Bates, Attorney (No Model.)
F. WEBER.
DUMPING WAGON.
No. 501,390. Patented July 11, 1893.
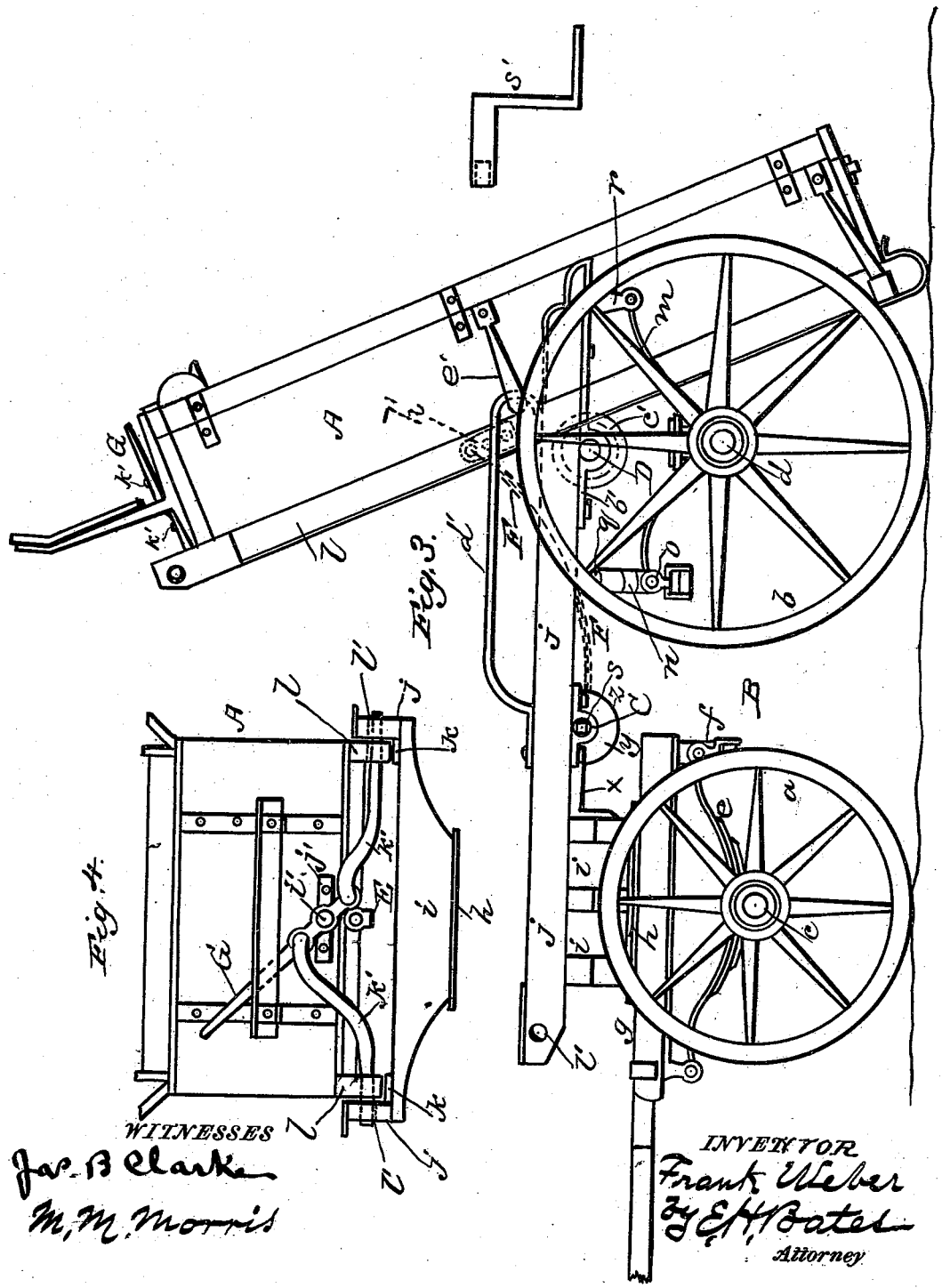
WITNESSES
Jas. B Clarke
M. M. Morris
INVENTOR
Frank Weber
by E. H. Bates
Attorney
2 Sheets—Sheet 2.

UNITED STATES PATENT OFFICE.

FRANK WEBER, OF LOUISVILLE, KENTUCKY.

DUMPING-WAGON.

SPECIFICATION forming part of Letters Patent No. 501,390, dated July 11, 1893.

Application filed March 25, 1893. Serial No. 467,584. (No model.)

*To all whom it may concern:*

Be it known that I, FRANK WEBER, a citizen of the United States, residing at Louisville, in the county of Jefferson and State of Kentucky, have invented certain new and useful Improvements in Dumping-Wagons; and I do hereby declare the following to be a full, clear, and exact description of the invention, such as will enable others skilled in the art to which it appertains to make and use the same.

This invention has relation to improvements in dumping wagons and it consists in the novel construction, combination and arrangement of parts of which it is composed, whereby the driver or operator may readily and easily dump a load and after which quickly and easily return the body to its normal position, all as will be hereinafter more fully explained.

The annexed drawings, to which reference is made, fully illustrate my invention, in which—

Figure 1, represents a vertical sectional view of my improved dumping wagon. Fig. 2, is a bottom view of the same. Fig. 3, is a side view and Fig. 4, is a front view of the body.

Referring by letter to the accompanying drawings A, designates the body of the wagon and B, the transporting wheels, of which $a$ are the front and small wheels and $b$, the rear transporting wheels, while $c$ and $d$, indicate the front and rear axles. The front axle supports the platform springs, composed of the two side springs $e$ $e$ and cross spring $f$, all of which are shackled to the frame or bars $g$ carrying the fifth wheel $h$, which latter supports the cross bars or frame $i$, the outer ends of which are bolted to two side bars $j, j;$ between which the body of the wagon is arranged, and on either side of said fifth wheel, on the top of the frame $i$ and adjacent to said side bars are bolted two short bars $k, k$, upon which the forward ends of the bars $l, l$, of the body rests when the latter is in its normal position. The rear springs consist of the two side springs $m, m$, and a forward cross spring $n$ which are shackled to one another as at $o;$ the cross spring is clipped at $p$, to the cross bar $q$, which is bolted at its ends to each of the side bars of the running gear, and the rear end of each side spring $m$, is pivoted to a bracket $r$, on the under side of said side bars of the running gear. Thus it will be seen that there is no spring in rear of the hind axle to interfere with the dumping of the body.

C, represents a transverse rod having its end bearing in bearing plates secured to the under side of the side bars $j, j;$ the extreme ends $s$, of which are square and adapted to receive a crank handle $s'$, by which the body is operated. This rod C, has a central offset or crank $t$, to which is pivoted a pusher bar $u$, the free end $v$, of which has its play in a notch $w$ in one of the cross bars of the front platform or frame. Said rod C, is braced by brackets $x$, $x$, near the crank portion of said bar or rod. Upon each square end of this crank rod and within the side bars of the running gear are arranged rollers $y, y$, having a flange $z, z$ and which rollers turn with the crank rod, and a portion thereof presenting a flat surface, as at $a'$ for a purpose hereinafter explained.

D, represents a transverse rod having its end bearings in plates $b'$, secured to the under side of the side bars $j, j$, and the same is provided with rollers $c', c$, upon which the body travels in its backward, and forward movement, and which support the rear portion of said body when in its normal position, and said rollers also serve to support the body when in a dumped or inclined position. On the upper face of each of the side bars $j$ $j$, is secured a rod $d'$ to which is linked or connected a bracket $e'$, secured to each side of the body, and which serves as a stop and limits the rearward movement of the body as well as preventing said body from becoming disconnected or leaving the running gear.

Centrally arranged and extending from the front of the body rearwardly and secured to the under side thereof is a toothed bar E, which is engaged by the end or point $f'$ of the push bar aforesaid.

F. F, indicate a pair of chains, the forward ends of which are connected at $g'$, to the cranked cross rod while their opposite ends are secured to the inner face of the side rails or bars of the body, as shown at $h', h'$.

At the front of the body is a hand lever G, which is pivoted at $i'$, to a plate $j'$ and on either side of said pivot, said lever has pivoted to it the inner ends of two locking and unlocking rods $k', k';$ the free ends of which pass through perforations, laterally in the forward end of the side rails or bars of the body and into perforations $l'$, $l'$, in the side bars of the running gear, whereby the body and gear are locked together, when said body is in its normal position.

Having thus described the different parts of which my wagon is composed, I will now explain its operation.

The wagon body when in its normal position rests and is supported upon the front and hind rollers as well as upon the short bars $k$, $k$, and is locked in place by the rods, of the hand lever, entering the perforations in the forward ends of the side bars of the running gear. When it is desired to dump the body, the operator or driver, simply throws the hand lever to one side, thus withdrawing the locking rods from the perforations in the end of the side bars of the frame or running gear, after which the crank handle is applied to either end of the cranked transverse bar, and turned, which causes the point or end of the push bar to engage the teeth in the rack bar and force the body rearwardly, at the same time the flat portion of the rollers $y$, $y$, are assisting, by their revolution, and engaging the side bars of the body; the body thus being passed rearwardly and over the hind rollers at the same time the chains are being paid out and become slack and when the body is dumped, the side rods and bracket connections prevent the two parts, i. e., the body and running gear, from separating. In replacing the body upon the running gear or to its normal position, the driver or operator, reverses the revolution or movement of the crank handle, thus winding the chains upon the cranked transverse rod thereby drawing the body forwardly and upon the running gear, when the locking hand lever is then thrown back or in an opposite direction, causing the rods $k'$, $k'$, to engage the perforations in the ends of the side bars of the running gear. Thus it will be seen that the two side bars of the running gear serve as guides to the body, in its movements and also prevents lateral displacement of said body, while the side bars or rods on the upper face of said running gear bars prevent said body from jumping or jolting from said gear, and by the arrangement of the cross spring in the rear, the body has a free movement in dumping and a dumping wagon as herein described, is simple in operation, durable, and inexpensive to manufacture.

What I claim is—

1. The combination with the body, side bars of the running gear, and front platform springs of the transverse spring connected to the transverse bar secured to the side bars, said spring arranged in front of the rear axle and shackled to the two side springs, the latter connected by their rear ends to the brackets on said side bars, substantially as described and for the purpose herein specified.

2. The body provided with the toothed bar secured to the under side thereof, the crank shaft and pusher bar pivoted thereto, the rollers secured to this shaft having flattened portions and the chains connecting the shaft to the body substantially as described.

3. The within described improved dumping wagon consisting of the running gear composed of the side bars secured to the front platform cross bars, the hind springs, the cross spring of which being secured to the cross bar, bolted to each of the side bars and arranged forward of the hind axle, the rear ends of the hind side spring secured to brackets secured to the side bars; the rod, secured to the latter and engaging the bracket, on the side of the body; the transverse shafts journaled to the side bars, having the rollers, the pusher bar pivoted to the crank of the front transverse shaft, the chains connecting said shaft to the body, the toothed bar secured to the under side of the body and adapted to engage the pusher bar, and the locking device composed of the two sliding rods and hand lever pivoted to the front of the body all substantially as described.

In testimony whereof I affix my signature in presence of two witnesses.

FRANK WEBER.

Witnesses:
A. J. SPECKERT,
J. A. LUDWIG.